(12) United States Patent
Sugiyama et al.

(10) Patent No.: US 8,132,829 B2
(45) Date of Patent: Mar. 13, 2012

(54) PRETENSIONER

(75) Inventors: Motoki Sugiyama, Aichi-ken (JP); Masaru Ukita, Aichi-ken (JP); Tetsushi Muromachi, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 251 days.

(21) Appl. No.: 12/575,413

(22) Filed: Oct. 7, 2009

(65) Prior Publication Data
US 2010/0090454 A1   Apr. 15, 2010

(30) Foreign Application Priority Data

Oct. 15, 2008   (JP) ................................. 2008-266481

(51) Int. Cl.
*B60R 22/46* (2006.01)
(52) U.S. Cl. ........................................ 280/806; 297/480
(58) Field of Classification Search .................. 280/805, 280/806, 807; 297/480
See application file for complete search history.

(56) References Cited

U.S. PATENT DOCUMENTS

| | | | | | |
|---|---|---|---|---|---|
| 4,927,175 | A | * | 5/1990 | Fohl | 280/806 |
| 5,310,219 | A | * | 5/1994 | Fohl | 280/806 |
| 5,310,220 | A | * | 5/1994 | Fohl | 280/806 |
| 5,887,897 | A | * | 3/1999 | Gill et al. | 280/806 |
| 6,877,776 | B2 | * | 4/2005 | Ukita et al. | 280/806 |
| 7,887,096 | B2 | * | 2/2011 | Kohama | 280/806 |
| 2002/0185852 | A1 | * | 12/2002 | Nakano et al. | 280/806 |
| 2003/0090101 | A1 | * | 5/2003 | Ennerdal | 280/806 |
| 2003/0184076 | A1 | * | 10/2003 | Devereaux et al. | 280/806 |
| 2004/0094946 | A1 | * | 5/2004 | Prentkowski | 280/806 |
| 2006/0279077 | A1 | * | 12/2006 | Nakano et al. | 280/806 |
| 2009/0115179 | A1 | * | 5/2009 | Zasu et al. | 280/806 |
| 2009/0184508 | A1 | * | 7/2009 | Kohama | 280/806 |

FOREIGN PATENT DOCUMENTS

| | | |
|---|---|---|
| DE | 10253880 A1 | 8/2003 |
| JP | 2007-62600 A | 3/2007 |
| JP | 2007-76493 A | 3/2007 |
| WO | 9834817 | 8/1998 |

OTHER PUBLICATIONS

English Translation of Office Action issued by German Patent Office in corresponding German Patent Application DE 102009044250 dated Dec. 6, 2010.

* cited by examiner

*Primary Examiner* — Eric Culbreth
*Assistant Examiner* — Barry Gooden, Jr.
(74) *Attorney, Agent, or Firm* — Roberts Mlotkowski Safran & Cole, P.C.

(57) ABSTRACT

In the pretensioner, a guiding wall is provided in a generator-side passing portion of a gas passing portion, and an inner portion of the generator-side passing portion at a portion where the guard wall is set is located to a base end rather than a tip end of a wire protective cylinder. Further, a gas generator mounting hole and the generator-side passing portion is inclined to be directed the base end of the wire protective cylinder. For this reason, gas that is jetted from a gas generator is blown to the base end of the wire protective cylinder or a surrounding portion thereof. As a result, even though the thickness of the wire protective cylinder is not set to be large, it can be against pressure of the blown gas.

5 Claims, 3 Drawing Sheets

PRETENSIONER

CROSS-REFERENCE TO RELATED APPLICATION

This application claims priority under 35 USC 119 from Japanese Patent Application No. 2008-266481 filed on Oct. 15, 2008, the disclosure of which is incorporated by reference herein.

BACKGROUND OF THE INVENTION

1. Field of the Invention

The present invention relates to a pretensioner capable of increasing a tensile force of a webbing belt by pulling an anchor to which an end of the webbing belt is fastened or a buckle device in which a tongue provided at the webbing belt is attached constituting a seat belt device of a vehicle when rapid deceleration of the vehicle.

2. Related Art

A pretensioner (pre-loader) that is disclosed in Japanese Patent Application Laid-Open (JP-A) Nos. 2007-62600 and 2007-76493 includes a housing at which a cylinder and a gas generator are mounted. In the housing, a through hole that is through the inside and the outside is formed, and a wire where a base end thereof in a longitudinal direction is connected to a piston in the cylinder passes through and extends to an external portion of the housing.

Further, the housing is connected to a high-pressure gas jet passage where high-pressure gas from the gas generator passes through. When the high-pressure gas that has passed through the high-pressure gas jet passage is sent to the cylinder, the piston slides in the cylinder by the pressure of the high-pressure gas. As a result, the wire is pulled.

A leakage of the high-pressure gas from the through hole causes a loss of the pressure for sliding the piston. For this reason, in the pretensioner that is disclosed in JP-A No. 2007-62600 and 2007-76493, a cylindrical protective sealing member that is provided at the high-pressure gas jet passage is press-contacted to an opening end of the through hole at the side of the high-pressure gas jet passage, thereby preventing or suppressing a leakage of the high-pressure gas from the high-pressure gas jet passage to the through hole.

In the configuration disclosed in JP-A Nos. 2007-62600 and 2007-76493, the gas generator is mounted in the housing in an inclined state, such that the high-pressure gas jetted from the gas generator is directed toward the side of the sealing member of the protective sealing member (that is, the side opposite to the side of the cylinder or the piston at the high-pressure gas jet passage). However, even though the gas generator is mounted in the inclined manner, the high-pressure gas is blown over a wide range of the side of a protective member in the protective sealing member (that is, the side closer to the cylinder or the piston than the sealing member constituting the protective sealing member). For this reason, it is necessary that the wall thickness of the protective member constituting the protective sealing member is set to be large so as to be against the heat or pressure of the high-pressure gas. As a result, since the size of the protective sealing member is increased, even though the larger protective sealing member is used, the size of the housing is increased in order to secure a space of the high-pressure gas jet passage.

SUMMARY OF THE INVENTION

Accordingly, the present invention has been made in consideration of the above-described problems, and the invention provides a pretensioner that can prevent or suppress a size-increase of a guarding section that is for preventing or suppressing gas generated by a gas generating section from being directly blown to a connection member such as a wire.

A pretensioner according to a first aspect of the invention includes: a cylinder whose one end portion opens and that slidably accommodates therein a piston; a connecting member, a tip end portion of which is connected to an anchor to which a tip end portion in a longitudinal direction of a webbing belt configuring a seat belt device is connected, or a buckle to which a tongue provided at an intermediate portion in the longitudinal direction of the webbing belt is attached, and a base end portion of which is connected to the piston, the base end portion of the connecting member being pulled by the piston by the piston sliding toward the other end of the cylinder so that the connecting member moves toward the other end of the cylinder; a gas generating section that generates gas by being activated; a pretensioner body at which a cylinder mounting portion, a gas generating section mounting portion and a gas passing portion are formed, the one end portion of the cylinder being mounted in the cylinder mounting portion, the gas generating section being mounted in the gas generating section mounting portion provided at a position different from a position of the cylinder mounting portion, and the gas passing portion linking the cylinder mounting portion and the gas generating section mounting portion such that the gas generated at the gas generating section passes therein toward the cylinder, and the connecting member which is from the one end portion of the cylinder to the anchor or the buckle passing through the gas passing portion; a through hole formed at the pretensioner body, whose one end portion opens at an inner peripheral portion of the gas passing portion and whose other end portion opens at an outer surface of the pretensioner body, the connecting member which is from the gas passing portion to the anchor or the buckle passing through the through hole; a guard section extending from an edge of the one end portion of the through hole toward the inside of the gas passing portion, and existing between the gas generating section and the connecting member, the guard section suppressing the gas generated at the gas generating section from being blown to the connecting member; and a gas guiding section provided at the inside of the gas passing portion between the guard section and the gas generating section mounting portion, the gas guiding section that guiding the gas generated at the gas generating section toward a base end portion of the guard section.

In the pretensioner according to the first aspect of the invention, when the gas generating section that is mounted in the gas generating section mounting portion of the pretensioner body is activated, the gas is generated in the gas generating section. The gas that is generated by the gas generating section passes through the gas passing portion formed in the pretensioner body, and is sent to the inside of the cylinder from one end portion of the cylinder mounted in the cylinder mounting portion of the pretensioner body. By the pressure of the gas, the piston that is accommodated in the cylinder slides toward the other end side of the cylinder, and the connecting member is pulled to the other end side of the cylinder by the piston sliding toward the other end side of the cylinder.

The connecting member passes through the through hole and the gas passing portion of the pretensioner body from the one end portion of the cylinder and extends to the outside of the pretensioner, and the tip end side thereof is connected to the buckle or the anchor. Therefore, the base end side of the connecting member is pulled by the piston and is moved toward the other end side of the cylinder. As a result, the buckle or the tongue that is connected to the tip end side of the connecting member is pulled. When the buckle is pulled, the webbing belt where the tongue is provided is pulled via the tongue mounted in the buckle. Meanwhile, when the anchor is pulled, the webbing belt whose tip end is connected to the anchor is pulled. As such, when the webbing belt is pulled, a body of a vehicle occupant who wears the webbing belt is strongly restrained by the webbing belt.

In the pretensioner according to the first aspect of the invention, from the edge of an end (one end) at the gas passing portion side of the through hole in which the connecting member passes, the guard section extends to the inside of the gas passing portion. Since the guard section exists between the gas generating section and the connecting member, the gas that is generated by the gas generating section is blocked by the guard section and is not directly blown to the connecting member.

In this case, inside the gas passing portion, the gas guiding section is provided between the guard section and the gas generating section mounting portion provided in the pretensioner body, and the gas that is generated by the gas generating section is directed toward the base end side of the guard section when the gas passing the gas passing portion. For this reason, the gas that is jetted from the gas generating section is mainly blown to the vicinity of the base end of the guard section. As described above, since the guard section extends from the edge at the one end of the through hole, mechanical strength of the base end is higher than that of the tip end side. For this reason, even though the entire mechanical strength of the guard section against the pressure and the like of the gas that is generated by the gas generating section is not set to be high, the mechanical strength against the pressure of the gas can be secured.

It is possible that the gas passing portion includes a gas generating section side gas passing portion, a cylinder side gas passing portion and a bent portion located between the gas generating section side gas passing portion and the cylinder side gas passing portion, and the gas guiding section is formed such that a direction from the gas generating section side gas passing portion toward the bent portion is inclined toward the other end portion of the through hole with respect to a direction orthogonal to the longitudinal direction of the connecting member located in the cylinder side gas passing portion so that the gas passing through gas generating section side gas passing portion is directed toward the base end portion of the guard section.

In a pretensioner according to a second aspect of the invention, in the first aspect of the invention, the gas generating section mounting portion is formed to have a tube shape, whose one end portion which is at the side of the gas passing portion communicates with the gas passing portion and whose other end portion which is at the side opposite to the gas passing portion opens, the gas generating section being mounted at the other end portion of the gas generating section mounting portion, and the gas guiding section provided at the inside of the gas passing portion is formed such that an opening center of the one end portion of the gas generating section mounting portion is offset with respect to an opening center of the other end portion of the gas generating section mounting portion, in a direction opposite to an extending direction of the guard section from the edge of the one end portion of the through hole.

In the pretensioner according to the second aspect of the invention, the gas generating section mounting portion that is formed in the pretensioner body has a cylindrical (tube) shape. The end of the gas generating section mounting portion that is opposite to the gas passing portion side is opened, and the gas generating section is mounted from this end that is opposite to the gas passing portion side. Further, the end of the gas generating section mounting portion at the side of the gas passing portion communicates with the gas passing portion. As a result, the gas that is generated by the gas generating section is sent to the gas passing portion.

In this case, the gas guiding section is provided inside the gas passing portion, the opening center at the gas passing portion side of the gas generating section mounting portion with respect to the opening center that is opposite to the gas passing portion side is offset in the direction opposite to the extending direction of the guard section from the edge of the one end portion of the through hole (in the gas passing portion). As such, since the opening center of the end of the gas generating section mounting portion at the side of the gas passing portion is offset, in the pretensioner according to the second aspect of the invention, the gas that is jetted from the gas generating section is mainly blown to the vicinity of the base end of the guard section.

In a pretensioner according to a third aspect of the invention, in the first or second aspect, the gas guiding section is formed such that a jetting direction of the gas generated at the gas generating section is inclined toward the other end portion of the through hole with respect to a direction orthogonal to the longitudinal direction of the connecting member located in the gas passing portion.

In the pretensioner according to the third aspect of the invention, the gas guiding section is formed such that a jetting direction of the gas generated at the gas generating section is inclined toward the other end portion of the through hole with respect to a direction orthogonal to the longitudinal direction of the connecting member located in the gas passing portion. For this reason, the gas that is jetted from the gas generating section is mainly blown to the vicinity of the one end of the through hole, that is, the vicinity of the base end of the guard section. As described above, since the guard section extends from the edge in the one end of the through hole, the base end side has mechanical strength higher than that of the tip end side. For this reason, even though the entire mechanical strength of the guard section against the pressure of the gas generated by the gas generating section is not set to be high, the mechanical strength against the pressure of the gas can be secured.

The pretensioner according to the aspects of the invention can prevent or suppress a size increase of the guarding section for preventing or suppressing the gas generated by the gas generating section from being directly blown to the connecting member such as the wire.

BRIEF DESCRIPTION OF THE DRAWINGS

An exemplary embodiment of the invention will be described in detail with reference to the following figures, wherein.

DETAILED DESCRIPTION OF THE EXEMPLARY EMBODIMENT

<Configuration of this Exemplary Embodiment>

Figure 1:
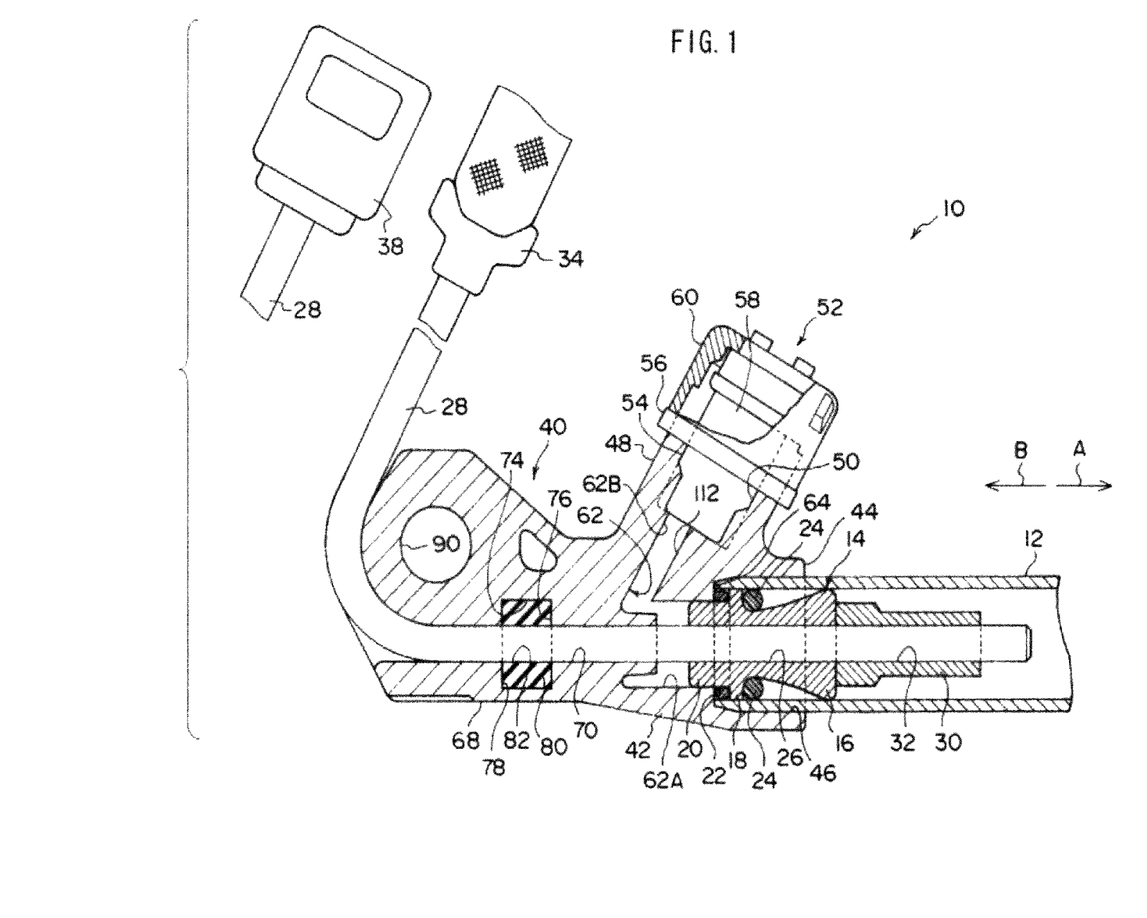
FIG. 1 is a cross-sectional view illustrating the configuration of a main portion of a pretensioner according to an exemplary embodiment of the present invention.

FIG. 1 is a cross-sectional view illustrating the configuration of a pretensioner 10 according to an exemplary embodiment of the invention.

As shown in FIG. 1, the pretensioner 10 includes a cylinder 12. The cylinder 12 is formed in a cylindrical shape (a tube shape) in which at least one of end portions thereof is opened. The cylinder 12 accommodates inside thereof a piston 14 that is formed by performing forge forming (molding) of metal. The piston 14 includes a piston body 16. The piston body 16 is configured such that an outer diameter gradually increases toward the side of a tip end (another end) of the cylinder 12 (side of a direction shown by an arrow A in FIG. 1), and, at least, it is formed into cone shape such that the outer circumferential shape of an end of the piston main body 16 at the tip end side of the cylinder 12 is almost equal to the inner circumferential shape of the cylinder 12, by cutting the forged molded work piece.

In an end of the piston body 16 at a base end (one end) side of the cylinder 12 (side of a direction shown by an arrow B in FIG. 1), a flange portion 18 whose outer circumferential shape is approximately equal to the inner circumferential shape of the cylinder 12 is formed approximately concentrically with respect to the end of the piston body 16 at the tip end side of the cylinder 12. The flange portion 18 and the end of the piston body 16 at the tip end side of the cylinder 12 slidably contact in the inner circumferential portion of the cylinder 12, and the piston 14 can slide between the tip end and the other end of the cylinder 12. In the end of the flange portion 18 at the base end side of the cylinder 12, a small-diameter portion 20 whose outer diameter is smaller than that of the flange portion 18 is formed approximately concentrically with respect to the flange portion 18.

In the outer circumferential portion of the small-diameter portion 20, an O-ring 22 that is annularly formed by using a rubber material or a synthetic resin material having approximately the same elasticity as that of the is mounted. An entire region along an outer circumferential direction of the small-diameter portion 20 of the O-ring adheres (closely contacts) to the small-diameter portion 20 and also adheres (closely contacts) to the inner circumferential portion of the cylinder 12. The tip end side and the other end side of the cylinder 12, that are separated by the O-ring 22 as a boundary, are sealed by the O-ring 22.

In this case, in the pretensioner 10 according to this exemplary embodiment, the O-ring 22 is mounted in the small-diameter portion 20 that is formed in the end of the flange portion 18, but a groove that has a ring shape to fit the O-ring 22 is not formed in the piston 14. For this reason, the shape of the piston 14 can be simplified, and a machining process of forming the piston 14 can be reduced.

At the side of the flange portion 18 at the tip end side of the cylinder 12, plural clutch spheres 24 are disposed at appropriate intervals in an outer circumferential direction of the piston body 16. A diameter of each clutch sphere 24 is set to ½ or less of a difference between an internal diameter of the cylinder 12 and an outer diameter of the piston body 16 in the vicinity of the end of the piston body 16 at the side of the flange portion 18. When the piston 14 moves from the base end side of the cylinder 12 to the tip end side of the cylinder 12 (that is, when the piston 14 slides into the cylinder 12 in the direction shown by the arrow A in FIG. 1), if each clutch sphere 24 moves on the outer circumferential surface (inclined surface) of the piston body 16 due to inertia, the clutch sphere 24 is interposed (sandwiched) by the outer circumferential portion of the piston body 16 and the inner circumferential portion of the cylinder 12.

In this state, if the piston 14 further moves to the tip end side of the cylinder 12, the clutch sphere 24 that moves to the base end side of the cylinder 12 according to the movement of the piston 14 makes the cylinder 12 to be deformed from the inner circumferential side of the cylinder 12 or shaves the inner circumferential portion of the cylinder 12. Friction of when the cylinder 12 is deformed or shaved by the crutch sphere 24 regulates sliding of the piston 14 toward the base end side of the cylinder 12.

Meanwhile, a through hole 26 is formed in the piston 14. The through hole 26 has one end that is opened at a surface of the piston body 16 at the side opposite to the flange portion 18, and the other end that is opened at a surface of the small-diameter portion 20 at the side opposite to the flange portion 18. The pretensioner 10 includes a wire 28 that serves as a connecting member, and the wire 28 passes through the through hole 26. At the side of the piston 14 at the tip end side of the cylinder 12, a piece 30 is provided.

In the piece 30, a through hole 32 is formed, and the wire 28 passes through the through hole 32. Retaining is performed with respect to a portion of the wire 28 that has passed through the through hole 32 toward the side of the piece 30 opposite to the piston 14, so the wire 28 cannot get out of the piece 30 from the side of the piston 14 after passing through the through hole 32. Accordingly, the wire 28 is regulated to get out of the piston 14 from the side opposite to the piece 30 after passing through the through hole 26.

An end of the wire 28 at the side that is opposite to the side where the piece 30 is provided is connected to an anchor plate 34 that serves as an anchor constituting a three-point-type seatbelt device as an aspect of a seatbelt device of a vehicle for example. Although not shown in detail herein, the anchor plate 34 is provided near a floor portion of the vehicle at one side of a widthwise direction of a seat provided in the vehicle. In the anchor plate 34, a tip end of a webbing belt 36 as a longitudinal belt constituting the three-point-type seatbelt device is connected. A base end side of the webbing belt 36 is downward folded in a state where the base end thereof passes through a through anchor provided near a ceiling portion of the vehicle at one side of the seat in a widthwise direction, and is connected to a spool of a webbing winding device that is provided near the floor portion of the vehicle at one side of the seat in the widthwise direction.

Between the through anchor and the anchor plate 34, the webbing belt 36 passes through a tongue plate. A vehicle occupant who sits at the seat wears the webbing belt 36 at the front of the vehicle occupant while extending the webbing belt 36 from the spool of the webbing winding device. In this state, mounting the tongue plate in the buckle 38 which is provided near the floor portion of the vehicle at the other side of the seat in the widthwise direction. As a result, there is a wearing state of the webbing belt 36 with respect to a body of the vehicle occupant.

In the above description, the end of the wire 28 at the side that is opposite to the side where the piece 30 is provided is connected to the anchor plate 34. However, the end of the wire 28 at the side that is opposite to the side where the piece 30 is provided may be connected to the buckle 38.

Further, as shown in FIG. 1, the pretensioner 10 includes a base cartridge 40 that serves as a pretensioner main body. The base cartridge 40 includes a body portion 42. In the body portion 42, a cylinder mounting portion 44 is formed. In the cylinder mounting portion 44, a mounting hole 46 is formed. The mounting hole 46 has one end that is opened at an outer surface of the cylinder mounting portion 44. An inner diameter at an opening end of the cylinder mounting portion 44 is slightly larger than an outer diameter of the base end side of the cylinder 12, and the cylinder 12 can be inserted into the opening end of the mounting hole 46, from its base end.

For example, in the inner circumferential portion of the mounting hole 46, a female screw (not shown) is formed. In the outer circumferential portion of the base end side of the cylinder 12, a male screw (not shown) is formed to correspond to the female screw. When the male screw of the cylinder 12 is screwed to the female screw of the mounting hole 46, the cylinder 12 is connected to the base cartridge 40.

In the body portion 42 a gas generator mounting portion 48 that serves as a gas generating section mounting portion is formed. The gas generator mounting portion 48 is provided at the side face of the body portion 42 which side face is along a direction crossing an opening direction of the mounting hole 46 of the cylinder mounting portion 44. At the gas generator mounting portion 48, a gas generator mounting hole 50 is formed. The gas generator mounting hole 50 has one of both ends (that is, the other end of the gas generating section mounting portion described in the aspects of the invention) that is opened at an outer surface of the gas generator mounting portion 48.

The gas generator mounting portion 48 is mounted with a gas generator 52 that serves as a gas generating section. The gas generator 52 includes a fitting portion 54. The fitting portion 54 has an outer circumferential shape that is approximately equal to an inner circumferential shape of the gas generator mounting hole 50, so the gas generator 52 can be fitted from the opening end of the gas generator mounting hole 50. At one end (upper end in FIG. 1) of the gas generator 52, a flange portion 56 is formed, which has an outer circumferential shape that is larger than an outer circumferential shape of the gas generator 52. When the fitting portion 54 is fitted into the gas generator mounting hole 50, the flange portion 56 interferes with the end of the gas generator mounting portion 48 at the opening end side of the gas generator mounting hole 50.

At the side of the flange portion 56 that is opposite to the fitting portion 54, a head portion 58 is formed. From the side of the head portion 58 that is opposite to the flange portion 56, a cap 60 is mounted in the gas generator mounting portion 48. By the cap 60, retaining of the gas generator 52 from the gas generator mounting portion 48 is made. The gas generator 52 that is mounted in the gas generator mounting portion 48 activates to generate gas immediately, and jets the gas from the end of the fitting portion 54 that is opposite to the flange portion 56.

A gas passing portion 62 is formed continuously from an end (that is, one end of the gas generating section mounting portion described in the aspects of the invention) of the gas generator mounting hole 50 at the side opposite to the side where the fitting portion 54 of the gas generator 52 is fitted. The gas passing portion 62 is bent at an intermediate portion thereof to the side of the opening end of the mounting hole 46. In the gas passing portion 62, an inner diameter of a cylinder-side passing portion 62A that is a portion at the side of the mounting hole 46 from the bent portion is smaller than an inner diameter of the mounting hole 46, and an end of the cylinder-side passing portion 62A (the gas passing portion 62) at the side of the mounting hole 46 is opened at a bottom portion 64 of the mounting hole 46.

The inner diameter of the cylinder-side passing portion 62A is approximately equal to an outer diameter of the small-diameter portion 20. In a state where the base end side of the cylinder 12 is fitted into the mounting hole 46 and the base end of the cylinder 12 abuts to the bottom portion 64, the small-diameter portion 20 enters in the cylinder-side passing portion 62A. For this reason, the gas that is jetted from the gas generator 52 is guided to the gas passing portion 62. The gas that is guided to the gas passing portion 62 pressures the small-diameter portion 20 (that is, the piston 14) to the tip end side of the cylinder 12 with the pressure.

The portion that is the side of the gas generator mounting hole 50 from the bent portion of the gas passing portion 62 is a generator-side passing portion 62B, and an end of the generator-side passing portion 62B that is opposite to the bent portion of the gas passing portion 62 is opened at the bottom portion of the gas generator mounting hole 50. As described above, the gas generator mounting hole 50 is formed in the gas generator mounting portion 48. The gas generator mounting hole 50 has the bottom portion. However, as described above, in the bottom portion of the gas generator mounting hole 50, the generator-side passing portion 62B (the gas passing portion 62) is opened.

Figure 2:
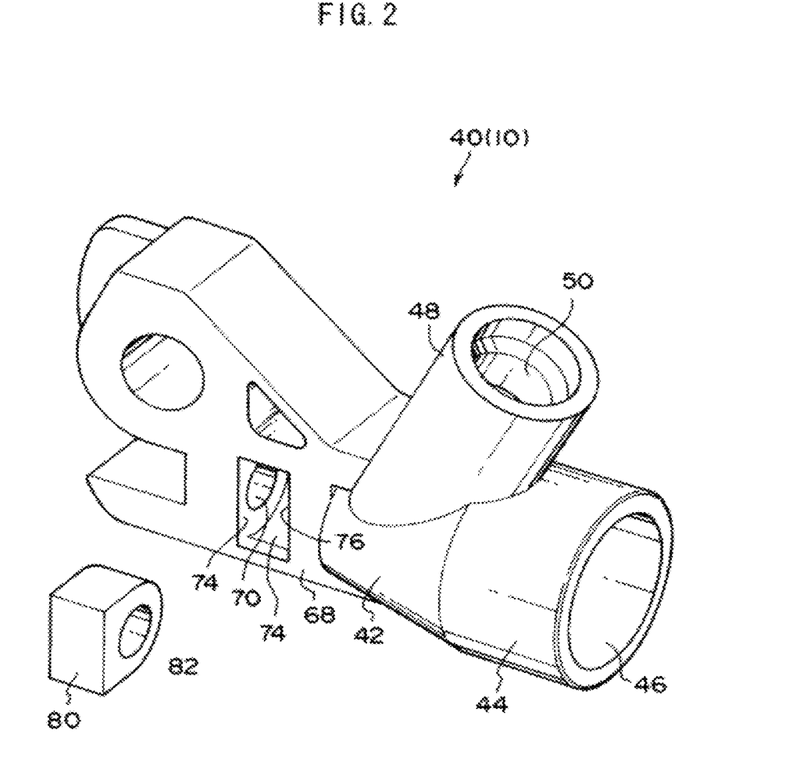
FIG. 2 is an exploded perspective view illustrating the appearance of a pretensioner body constituting a pretensioner according to an exemplary embodiment of the invention.

As such, the gas generator mounting portion 48 is formed in a "cylindrical shape (tube shape)". As shown in FIGS. 1 and 2, in the gas generator mounting portion 48 that is formed in a cylindrical shape, the end (that is, one end of the gas generating section mounting portion described in the aspects of the invention) at the side of the body portion 42 is offset in a direction opposite to a the opening direction (the direction of arrow A) of the open end of the mounting hole 46 of the cylinder mounting portion 44 (that is, is offset in the direction of the arrow B), with respect to the end (that is, the other end of the gas generating section mounting portion described in the aspects of the invention at the side of the cap 60.

As a result, in the gas generator mounting hole 50, the opening end of at the side of the generator-side passing portion 62B is offset in a direction opposite to a the opening direction (the direction of arrow A) of the open end of the mounting hole 46 of the cylinder mounting portion 44 (that is, is offset in the direction of the arrow B), with respect to the opening end (that is, opening end of the gas generator mounting hole 50 in the outer surface of the gas generator mounting portion 48) at the side of the cap 60. Further, the bent portion of the gas passing portion 62 is similarly offset, with respect to the opening end of the generator-side passing portion 62B at the side of the gas generator mounting hole 50.

The base cartridge 40 includes a guide portion 68. The guide portion 68 is formed at the body portion 42 at the side opposite to the cylinder mounting portion 44. In the guide portion 68, a wire passing portion 70 that serves as a through hole (described in the aspects of the invention) is formed. One end of the wire passing portion 70 is opened at the inner circumferential portion of the gas passing portion 62. Meanwhile, the other end of the wire passing portion 70 is opened at an outer surface of the guide portion 68 at the side opposite to the body portion 42. Further, an inner circumferential shape of the wire passing portion 70 is set to a shape approximately equal to the outer circumferential shape of the wire 28 (strictly, a shape that is slightly larger than the outer circumferential shape of the wire 28). As shown in FIG. 1, the wire 28 passes through the wire passing portion 70.

As shown in FIG. 1, a penetration direction of the wire passing portion 70 is approximately equal to a penetration direction of the mounting hole 46 formed in the cylinder mounting portion 44 (a direction along the arrows A and B). In addition, one end of the wire passing portion 70 (that is, opening end of the wire passing portion 70 at the inner circumferential portion of the gas passing portion 62) is disposed concentrically with respect to the end of the mounting hole 46 at the side of the gas passing portion 62 along the penetration direction of the mounting hole 46 formed in the cylinder mounting portion 44. For this reason, the wire 28 can linearly pass through the base cartridge 40.

Further, at the side of the other end of the wire passing portion 70 (the side opposite to the gas passing portion 62), a portion of the inner circumferential surface of the wire passing portion 70 is curved with a point at one side of an opening diameter direction of the wire passing portion 79 as a center of curvature. The wire 28 that is from the other end of the wire passing portion 70 toward the outside of the base cartridge 40 is curved along this curved inner circumferential surface of the wire passing portion 70 at the other end side of the wire passing portion 70. As a result, without causing excessive bending or curvature in the wire 28, the wire is curved to the side of the anchor plate 34 or the buckle 38 and is connected to the anchor plate 34 or the buckle 38.

Further, in the gas passing portion 62, a wire protective cylinder 72 that serves as a guard section is provided so as to correspond to the one end of the wire passing portion 70. The wire protective cylinder 72 is formed in a cylindrical (tube) shape in which an inner peripheral shape is approximately equal to an inner peripheral shape of the wire passing portion 70. The wire protective cylinder 72 is formed to protrude from an inner wall of the gas passing portion 62 so as to become coaxial to the one end of the wire passing portion 70, and the wire 28 that has passed through the wire protective cylinder 72 enters in the wire passing portion 70.

As shown in FIG. 1, in the generator-side passing portion 62B of the gas passing portion 62, a guiding wall 112 that serves as a gas guiding section is formed. The guiding wall 112 is formed such that, in the inner peripheral portion of the generator-side passing portion 62B, a portion at the side of the cylinder 12 along the longitudinal direction of the wire 28 in the cylinder-side passing portion 62A (the gas passing portion 62) is made to be thicker than the other portion.

As such, since the guiding wall 112 is formed in the generator-side passing portion 62B, the center of the inner circumferential shape of the generator-side passing portion 62B including the guiding wall 112 is located (closer) to the side opposite to the side of the cylinder 12 (that is, located to the side of the wire passing portion 70) along a longitudinal direction of the wire 28 in the cylinder-side passing portion 62A (the gas passing portion 62) than the center of the inner circumferential shape of the mounting hole 46 in the cylinder mounting portion 44. In a portion where the guiding wall 112 is set, the inner portion of the generator-side passing portion 62B is located (closer) to the base end side of the wire protective cylinder 72 than the tip end of the wire protective cylinder 72 along a protrusion direction of the wire protective cylinder 72.

As described above, in this exemplary embodiment, the end (that is, one end of the gas generating section mounting portion described in the aspects of the invention) of the gas generator mounting portion 48 at the side of the body portion 42 is offset in a direction opposite to a the opening direction (the direction of arrow A) of the open end of the mounting hole 46 of the cylinder mounting portion 44 (that is, is offset in the direction of the arrow B) (along a longitudinal direction of the wire 28 in the gas passing portion 62), with respect to the end (that is, the other end of the gas generating section mounting portion described in the aspects of the invention at the side of the cap 60.

As such, a offset direction that is oriented from the end of the gas generator mounting portion 48 at the side of the cap 60 toward the end of the gas generator mounting portion 48 at the side of the body portion 42 is inclined toward the base end (which is a root of the wire protective cylinder 72 and a connecting portion with the inner circumferential portion of the gas passing portion 62) of the wire protective cylinder 72, with respect to a direction perpendicular to a longitudinal direction of the wire 28 in the gas passing portion 62. As a result, a direction that is oriented from the end of the gas generator mounting hole 50 at the side of the cap 60 toward the end of the gas generator mounting hole 50 at the side of the gas passing portion 62, and a direction that is oriented from the end of the generator-side passing portion 62B of the gas passing portion 62 at the side of the gas generator mounting hole 50 toward the side of the bent portion of the gas passing portion 62 are inclined so as to be oriented toward the base end of the wire protective cylinder 72.

As such, in the pretensioner 10 according to this exemplary embodiment, the guiding wall 112 is set in the generator-side passing portion 62B of the gas passing portion 62. In addition, the direction that is oriented from the end of the gas generator mounting hole 50 at the side of the cap 60 toward the end of the gas generator mounting hole 50 at the side of the gas passing portion 62, and the direction that is oriented from the end of the generator-side passing portion 62B of the gas passing portion 62 at the side of the gas generator mounting hole 50 toward the side of the bent portion of the gas passing portion 62 are inclined so as to be directed toward to the base end of the wire protective cylinder 72. For example, the gas that is jetted from the gas generator 52 is mainly blown to the base end of the wire protective cylinder 72 and the vicinity portion thereof, and the gas interferes with the inner portion of the gas passing portion 62 (in general, inner portion of the bent portion of the gas passing portion 62) near the base end of the wire protective cylinder 72. As a result, the spread direction of the gas is changed to a direction that is oriented to the side of the cylinder 12.

Meanwhile, in the guide portion 68, a packing accommodating portion 74 is formed. The packing accommodating portion 74 is formed in an intermediate portion of the wire passing portion 70 (between the one end and the other end of the wire passing portion 70). Further, the packing accommodating portion 74 is formed in a rectangular shape, in front view of the base cartridge 40, in which a pair of sides facing each other are parallel to the vicinity portion of a formation position of the packing accommodating portion 74 of the wire passing portion 70, and another pair of sides facing each other are orthogonal to vicinity portion of the formation position of the packing accommodating portion 74 of the wire passing portion 70. Of inner walls of the packing accommodating portion 74 that has a rectangular shape in front view of the base cartridge 40, one of the inner walls where a wall surface is oriented to the side of the one end of the wire passing portion 70 along a penetration direction of the wire passing portion 70 is a press contact wall 76 that serves as a regulating portion, and another of the inner walls where a wall surface is oriented to the side of the other end of the wire passing portion 70 is a press contact wall 78.

The packing accommodating portion 74 is opened at only an outer surface of the front surface side of the base cartridge 40 that is orthogonal to the penetration direction of the wire passing portion 70. In the opened packing accommodating portion 74, a packing 80 that serves as a sealing section is accommodated. The packing 80 is formed in a block shape, such that an outer circumferential shape thereof is approximately equal to the inner circumferential shape of the packing accommodating portion 74, using a rubber, an elastic member having approximately the same elasticity as rubber or a synthetic resin material having rigidity higher than that of the elastic member.

In this exemplary embodiment, since the outer circumferential shape of the packing 80 is made to become the block shape approximately equal to the inner circumferential shape of the packing accommodating portion 74, the packing 80 can be smoothly inserted into the packing accommodating portion 74. However, for example, the outer circumferential shape of the packing 80 may be made to become the block shape slightly larger than the inner circumferential shape of the packing accommodating portion 74, and the packing 80 may be pushed in the packing accommodating portion 74 to be against the elasticity of the packing 80. In the case of the configuration, since the packing 80 is strongly pressed with pressure to the inner walls of the packing accommodating portion 74 including the press contact wall 76 with its elasticity, a sealing effect using the packing 80 becomes high.

As shown in FIGS. 1 and 2, the through hole 82 is formed in the packing 80. In the through hole 82, the inner diameter is approximately equal to the outer diameter of the wire 28. One end communicates with the wire passing portion 70 at one end side of the packing accommodating portion 74, and the other end communicates with the wire passing portion 70 at the other end side of the packing accommodating portion 74, in a state where the packing 80 is accommodated in the packing accommodating portion 74. Accordingly, the wire 28 that passes through the wire passing portion 70 passes through the through hole 82 of the packing 80 in the packing accommodating portion 74. Further, as described above, since the inner diameter of the through hole 82 is approximately equal to the outer diameter of the wire 28, a gap is not formed between the inner circumferential portion of the through hole 82 and the outer circumferential portion of the wire 28, in a state where the wire 28 passes through the through hole 82.

Figure 3:
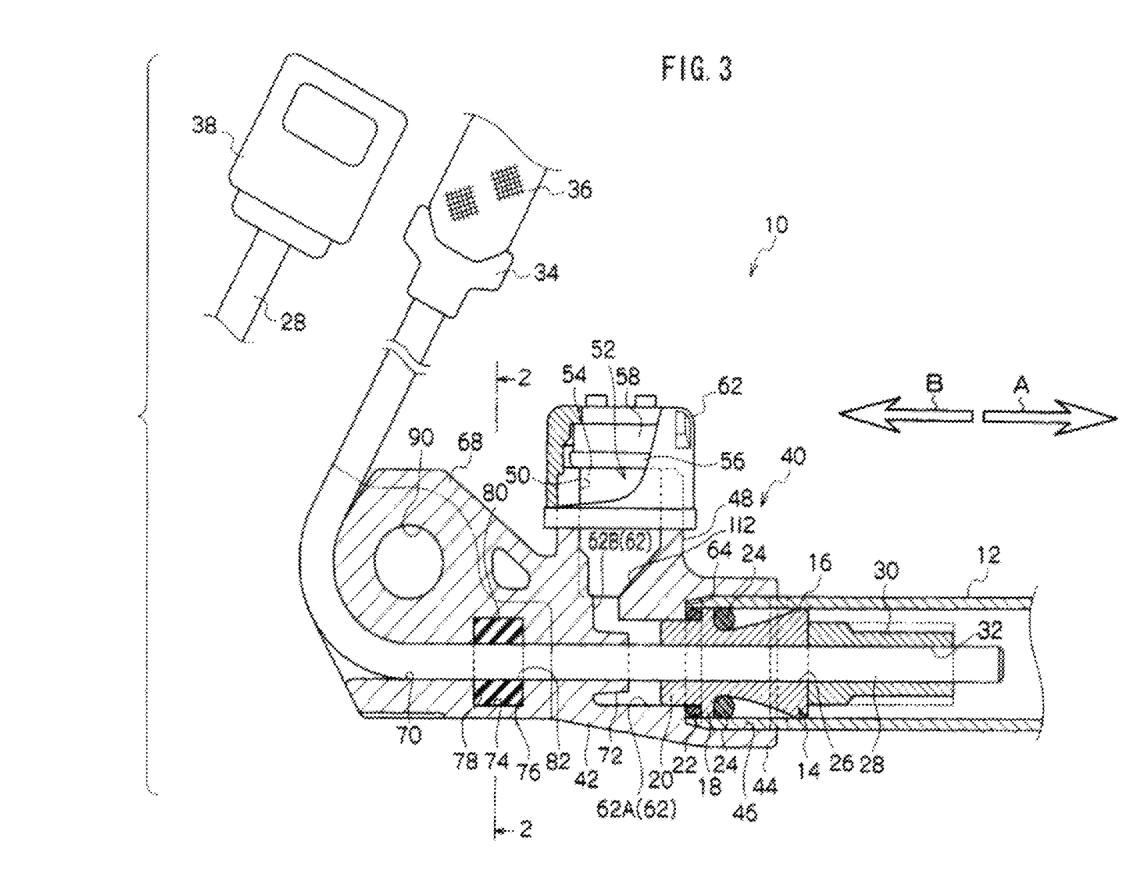
FIG. 3 is a cross-sectional view illustrating a modification of the configuration of a main portion of a pretensioner according to an exemplary embodiment of the invention.

Meanwhile, as shown in FIGS. 1 and 3, a circular hole 90 is formed in the base cartridge 40. A fastening member, such as a fixing bolt, passes through the circular hole 90. The fastening member, such as the fixing bolt, which has passed through the circular hole 90, is fixed to a frame portion of the seat or a vehicle body. As a result, the pretensioner 10 is mounted in the vehicle.

<Operation and Effect of the Exemplary Embodiment>

Next, an operation and an effect of the exemplary embodiment will be described.

In a state where the vehicle occupant sits at the seat and wears the webbing belt of the seatbelt device, for example, if a detecting section, such as an acceleration sensor, which is provided in the vehicle, detects that the vehicle is in a rapid deceleration state, an ECU outputs an ignition signal. If the ignition signal is input to the gas generator 52, a gas-generating agent in the gas generator 52 is ignited. The ignited gas-generating agent is combusted in a short time and rapidly generates gas.

The gas generated in this way is sent to the gas passing portion 62. The gas that is sent to the gas passing portion 62 pressurizes the piston 14 located in the vicinity of the base end of the cylinder 12 (the end of the cylinder 12 at the side of the gas passing portion 62) toward the tip end side of the cylinder 12 (side opposite to the gas passing portion 62 of the cylinder 12). In this way, with the pressure of the gas that is applied to the piston 14, the piston 14 slides toward the tip end side of the cylinder 12 while pressurizing the piece 30 toward the tip end side of the cylinder 12.

When the wire 28 is pulled by the piece 30 sliding in this way, the anchor plate 34 or the buckle 38 that is connected to the end of the wire 28 is pulled. As a result, tension is applied to the webbing belt 36 that is worn on the body of the vehicle occupant of the vehicle. As such, by the tension being applied to the webbing belt 36, slight looseness of the webbing belt 36, that is, so-called "slack" is removed, and a restraining force of when the webbing belt 36 restrains the body of the vehicle occupant increases, which results in further strongly restraining the body of the vehicle occupant.

In this exemplary embodiment, the wire 28 that passes through the gas passing portion 62 passes through the inside of the wire protective cylinder 72 that is formed to protrude from the inner peripheral portion of the gas passing portion 62. So, the wire protective cylinder 72 is substantially existed between the gas generator mounting hole 50 (and the generator-side passing portion 62B) and the wire 28. For this reason, the gas that has passed through the generator-side passing portion 62B of the gas passing portion 62 is blown to the wire protective cylinder 72, so the gas is not directly blown to the wire 28. As such, in this exemplary embodiment, the wire 28 can be protected from the high-pressure gas at the high temperature.

Further, in this exemplary embodiment, since the guiding wall 112 is provided in the generator-side passing portion 62B of the gas passing portion 62. In the portion where the guiding wall 112 is set, the inner peripheral portion of the generator-side passing portion 62B is located (closer) to the base end side than the tip end of the wire protective cylinder 72 along the protrusion direction of the wire protective cylinder 72.

For this reason, the gas that passes through the generator-side passing portion 62B of the gas passing portion 62 is not directly blown to the tip end of the wire protective cylinder 72 or the vicinity portion thereof, and is mainly blown to the wire protective cylinder 72 at the base end side which is from the intermediate portion to the base end of the wire protective cylinder 72 along the protrusion direction of the wire protective cylinder 72 protruding from the inner portion of the gas passing portion 62. In addition, the direction that is oriented from the end of the gas generator mounting hole 50 at the side of the cap 60 toward the end at the side of the gas passing portion 62, and the direction that is oriented from the end of the generator-side passing portion 62B of the gas passing portion 62 at the gas generator mounting hole 50 side toward the side of the bent portion of the gas passing portion 62 are inclined so as to be directed toward the base end of the wire protective cylinder 72.

For this reason, the gas that is jetted from the gas generator 52 is effectively blown to the base end of the wire protective cylinder 72 and the vicinity portion thereof, not the vicinity portion of the tip end of the wire protective cylinder 72. The gas interferes with the inner portion of the gas passing portion 62 at the vicinity portion of the base end of the wire protective cylinder 72 (in general, inner portion of the bent portion of the gas passing portion 62), and the spread direction of the gas is changed to a direction that is oriented to the side of the cylinder 12.

In this case, since the wire protective cylinder 72 protrudes from the inner portion of the gas passing portion 62, the base end of the wire protective cylinder 72 that is coupled to the inner portion of the gas passing portion 62 and the vicinity portion thereof has large strength against an external force, as compared with the tip end which is a free end and the vicinity portion thereof. For this reason, even though the thickness of the wire protective cylinder 72 is not set to be large, the wire protective cylinder 72 can have resistance against the pressure of the blown gas.

The gas is blown to the side of the base end of the wire protective cylinder 72, and the gas is blown to the wire protective cylinder 72 and also a portion of the gas is directly blown to the inner portion of the gas passing portion 62. Since the inner portion of the gas passing portion 62 is a part of the base cartridge 40, the inner portion of the gas passing portion 62 has mechanical strength sufficiently higher than that of the wire protective cylinder 72, and can be easily against the pressure of the gas. As such, in this exemplary embodiment, since the gas is directly blown to the base end of the wire protective cylinder 72 and the vicinity portion thereof and the inner portion of the gas passing portion 62, the thickness of the wire protective cylinder 72 can be set to be thin. As such, since the volume of the gas passing portion 62 can be deceased by a thin-amount in thickness of the wire protective cylinder 72, the size or weight of the base cartridge 40 can be decreased.

In the pretensioner 10 according to this exemplary embodiment, the guiding wall 112 and the wire protective cylinder 72 is formed in the gas passing portion 62, however the packing 80 is not provided in the gas passing portion 62. As a result, the wire protective cylinder 72 can be formed in the gas passing portion 62 without increasing the sizes of the gas passing portion 62 and the base cartridge 40.

As such, the gas that is generated by the gas generator 52 and sent to the gas passing portion 62 may try to flow into the end of the wire passing portion 70 (the wire protective cylinder 72) that is opened at the inner surface of the gas passing portion 62. However, the gap is not substantially formed between the inner circumferential portion of the through hole 82 of the packing 80 through which the wire 28 passes at the intermediate portion of the wire passing portion 70 and the outer circumferential portion of the wire 28. For this reason, the gas does not leak from the other end of the wire passing portion 70 to the outside of the base cartridge 40 after passing through the wire passing portion 70 or the such leakage of the gas can be effectively suppressed. As a result, the pressure of the gas can be efficiently provided at the time of pressurizing the piston 14.

As such, when the wire 28 is pulled, the packing 80 is pulled by the wire 28 and may be moved. However, in the direction to which the packing 80 may move, the press contact wall 76 of the packing accommodating portion 74 faces the packing 80. For this reason, if the packing 80 is pulled by the wire 28 and try to move, the packing 80 is pressed to the press contact wall 76. For this reason, as described above, even though the wire 28 is pulled and moved, the packing 80 is not unnecessarily moved. Therefore, the movement of the packing 80 may cause lower sealing performance, but in the exemplary embodiment, the sealing performance of the packing 80 can be prevented or effectively suppressed from being lowered. In addition, since the packing 80 is pressed to the press contact wall 76, a space between the packing 80 and the press contact wall 76 can be effectively sealed, and the sealing performance can be further improved.

Since the packing accommodating portion 74 where the packing 80 is accommodated is opened at the outer surface of the front side of the base cartridge 40, even though the packing 80 moves in the movement direction of the wire 28, the packing 80 does not get out of the packing accommodating portion 74. For this reason, the configuration of retaining or the like to hold the packing 80 in the packing accommodating portion 74 is basically unnecessary.

In this exemplary embodiment, the direction that is oriented from the end of the gas generator mounting portion 48 at the side of the cap 60 toward the end of the gas generator mounting portion 48 at the side of the body portion 42 is inclined toward the base end of the wire protective cylinder 72 (that is, the root of the wire protective cylinder 72 and the connecting portion with the inner portion of the gas passing portion 62), with respect to the direction crossing the longitudinal direction of the wire 28 in the gas passing portion 62. Further, in this exemplary embodiment, the direction that is oriented from the end of the gas generator mounting hole 50 at the side of the cap 60 toward the end of the gas generator mounting hole 50 at the side of the gas passing portion 62, and the direction that is oriented from the end of the generator-side passing portion 62B of the gas passing portion 62 at the gas generator mounting hole 50 side toward the bent portion of the gas passing portion 62 are inclined to be directed to the base end of the wire protective cylinder 72.

However, the direction that is oriented from the end of the gas generator mounting portion 48 at the side of the cap 60 toward the end of the gas generator mounting portion 48 at the side of the body portion 42, the direction that is oriented from the end of the gas generator mounting hole 50 at the side of the cap 60 toward the end of the gas generator mounting hole 50 at the side of the gas passing portion 62, and the direction that is oriented from the end of the generator-side passing portion 62B of the gas passing portion 62 at the gas generator mounting hole 50 side toward the bent portion of the gas passing portion 62 may not be inclined to be directed to the base end of the wire protective cylinder 72.

For example, as shown in FIG. 3, it is possible as follows: the direction that is oriented from the end of the gas generator mounting portion 48 at the side of the cap 60 toward the end of the gas generator mounting portion 48 at the side of the body portion 42, the direction that is oriented from the end of the gas generator mounting hole 50 at the side of the cap 60 toward the end of the gas generator mounting hole 50 at the side of the gas passing portion 62, and the direction that is oriented from the end of the generator-side passing portion 62B of the gas passing portion 62 at the gas generator mounting hole 50 side toward the bent portion of the gas passing portion 62 is perpendicular to the longitudinal direction of the wire 28 in the gas passing portion 62; in addition, the thickness of the guiding wall 112 is set to be gradually increased from the gas generator mounting hole 50 side of the generator-side passing portion 62B toward the side of the bent portion of the gas passing portion 62; and the inner portion of the generator-side passing portion 62B in the portion where the guiding wall 112 is formed, at the end portion of the generator-side passing portion 62B in the bent portion side of the gas passing portion 62 where the thickness of the guiding wall 112 is maximized, is located at the side of the base end of the wire protective cylinder 72 rather than the tip end of the wire protective cylinder 72 (it is located further than the tip end of the wire protective cylinder 72 toward the base end of the wire protective cylinder 72). Even though this configuration is used, the same operation and effect as the above-described exemplary embodiment can be achieved.

What is claimed is:

1. A pretensioner comprising:
   a cylinder whose one end portion opens and that slidably accommodates therein a piston;
   a connecting member, a tip end portion of which is connected to:
     an anchor to which a tip end portion in a longitudinal direction of a webbing belt configuring a seat belt device is connected, or
     a buckle to which a tongue provided at an intermediate portion in the longitudinal direction of the webbing belt is attached, and
   a base end portion of which is connected to the piston, the base end portion of the connecting member being pulled by the piston sliding toward another end of the cylinder so that the connecting member moves toward the other end of the cylinder;
   a gas generating section that generates gas by being activated;
   a pretensioner body at which a cylinder mounting portion, a gas generating section mounting portion and a gas passing portion are formed,
   the one end portion of the cylinder being mounted in the cylinder mounting portion, the gas generating section being mounted in the gas generating section mounting portion provided at a position different from a position of the cylinder mounting portion, and the gas passing portion linking the cylinder mounting portion and the gas generating section mounting portion such that the gas generated at the gas generating section passes therein toward the cylinder, and the connecting member which passes through the one end portion of the cylinder and extends to the anchor or the buckle passes through the gas passing portion;

a through hole formed at the pretensioner body, whose one end portion opens at an inner peripheral portion of the gas passing portion and whose other end portion opens at an outer surface of the pretensioner body, the connecting member which passes through the gas passing portion and extends to the anchor or the buckle passing through the through hole;

a guard section axially extending from an edge of the one end portion of the through hole toward an inside of the gas passing portion, and existing between the gas generating section and the connecting member, the guard section suppressing the gas generated at the gas generating section from being blown on to the connecting member; and a gas guiding section provided at the inside of the gas passing portion between the guard section and the gas generating section mounting portion, the gas guiding section guiding the gas generated at the gas generating section toward a base end portion of the guard section, wherein the gas passing portion includes a gas generating section side gas passing portion at which the gas generating section mounting portion is provided, a cylinder side gas passing portion at which the cylinder mounting portion is provided, and a bent portion located between the gas generating section side gas passing portion and the cylinder side gas passing portion wherein an outlet end of the gas generating section side gas passing portion is defined in part by a side of the bent portion, the outlet end having an axial extent that is less than an axial extent of the guard section and that does not overlap a tip end of the guard section.

2. The pretensioner of claim 1, wherein
the gas guiding section is formed such that a jetting direction of the gas generated at the gas generating section is inclined toward the other end portion of the through hole with respect to a direction orthogonal to the longitudinal direction of the connecting member located in the gas passing portion.

3. The pretensioner of claim 1, wherein
the gas guiding section is formed such that a direction from the gas generating section side gas passing portion toward the bent portion is inclined toward the other end portion of the through hole with respect to a direction orthogonal to the longitudinal direction of the connecting member located in the cylinder side gas passing portion so that the gas passing through the gas generating section side gas passing portion is directed toward the base end portion of the guard section.

4. The pretensioner of claim 1, wherein
the gas generating section mounting portion is formed to have a tube shape, whose one end portion which is at a side of the gas passing portion communicates with the gas passing portion and whose other end portion which is at a side opposite to the gas passing portion opens, the gas generating section being mounted at the other end portion of the gas generating section mounting portion, and the gas guiding section provided at the inside of the gas passing portion is formed such that an opening center of the one end portion of the gas generating section mounting portion is offset with respect to an opening center of the other end portion of the gas generating section mounting portion, in a direction opposite to an extending direction of the guard section from the edge of the one end portion of the through hole.

5. The pretensioner of claim 4, wherein
the gas guiding section is formed such that a jetting direction of the gas generated at the gas generating section is inclined toward the other end portion of the through hole with respect to a direction orthogonal to the longitudinal direction of the connecting member located in the gas passing portion.

* * * * *